C. SWETT,

Assignor, by mesne assignments, to AMERICAN COTTON TIE SUPPLY CO.

Method of Fastening Cotton-Bale Ties.

No. 8,886. Reissued Sept. 9, 1879.

*Attest:*
R. F. Barnes.
C. Clarence Poole

*Inventor:*
Charles Swett, assignor to
American Cotton Tie Supply Co.
by Saml. A. Duncan.
Atty.

N. PETERS, PHOTO-LITHOGRAPHER, WASHINGTON, D. C.

UNITED STATES PATENT OFFICE.

AMERICAN COTTON TIE SUPPLY COMPANY, OF NEW ORLEANS, LOUISIANA, ASSIGNEE, BY MESNE ASSIGNMENTS, OF CHARLES SWETT.

IMPROVEMENT IN METHODS OF FASTENING COTTON-BALE TIES.

Specification forming part of Letters Patent No. 59,144, dated October 23, 1866; antedated April 23, 1866; Reissue No. 4,896, dated May 7, 1872; Reissue No. 8,886, dated September 9, 1879; application filed August 13, 1879.

*To all whom it may concern:*

Be it known that CHARLES SWETT, formerly of Vicksburg, in the State of Mississippi, but now a resident of Martinsville, county of Copiah, in said State, invented a new and useful Improvement in Bale-Ties, of which the following is a specification.

The invention of the said SWETT consists in a new mode of securing metallic bands or hoops on bales of cotton or of any equivalent elastic material, the object of it being to provide a tie capable of being rapidly manipulated, readily adjusted to bales of different sizes, and securely fastened after adjustment.

To this end, instead of riveting the ends of the band together after they are passed around the bale, as had sometimes been practiced, (but which is necessarily a slow method, and also impairs the strength of the band,) or interlocking the ends, as shown by David McComb in his patent of June 17, 1856, which method does not admit of the ready adjustment of the band, or using a single slotted link or buckle, requiring the free end of the band to be bent in the form of an oblate hook around one of the cross-bars of the buckle, which is a manipulation far from easy, except with material loss of compactness, SWETT devised as his link or buckle a fastening block or plate provided with two parallel slots or mortises, one of which was adapted to receive the end of the band first to be attached, while the other was so constructed as to receive the free end of the band, or that end which was last attached, permitting it to be passed directly through, and to be subsequently bent, so as to take hold on one of the bars of the buckle, as hereinafter explained.

His invention is illustrated in the accompanying drawings, in which—

Figure 1:
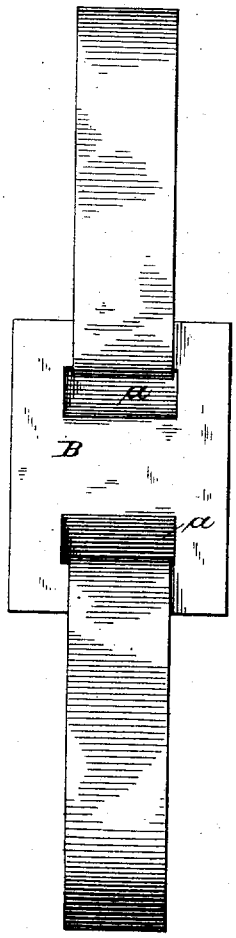
Figure 2:
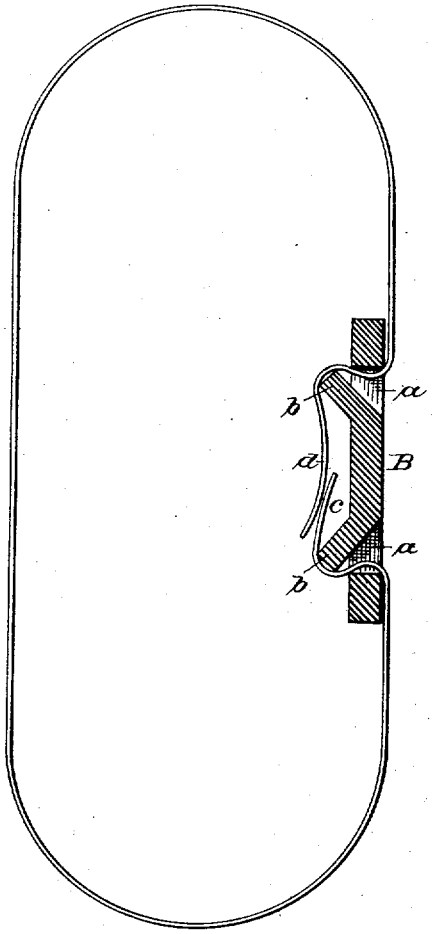

Figure 1 is a plan view of the tie. Fig. 2 is a sectional view of the same, showing the parts in the relative position which they occupy when on a bale of cotton.

For convenience of illustration the band here shown is much shorter in proportion to its width than is actually used in the baling of cotton.

The block or plate B, of suitable size and thickness, is made of metal, either by stamping or casting, and, as shown in the drawings, is provided with two transverse and parallel openings or slots, *a a*, of a length corresponding to the width of the band or hoop.

To apply the fastening one end, *c*, of the hoop is secured to the buckle by passing it in through one of the slots and bending it into position. The other end, *d*, after being passed around the bale while under pressure, is put down through the other slot, lapping beyond the end *c* as far as the length of the hoop and size of the bale will permit. To accomplish this the buckle, of course, is to be turned from the side of the bale sufficiently to let the end *d* pass through its slot while still substantially straight. When the band has been drawn tight, the restoration of the buckle to its normal position (parallel with the face of the bale) will cause a sharp bend to be made in the hoop at the point where it enters the buckle, thereby forming a shoulder or hook which is adapted to take against the inner edge of the adjacent bar of the buckle. This bend is perfected when the bale is released from pressure, for then the band ends are drawn in opposite directions with great force by the expansion of the cotton, the buckle being correspondingly rotated until brought down flat against the side of the bale, and the shoulders or hooks formed in the band being brought into close engagement with their respective bars.

In order to make sharper bends in his band ends, and thus hold them the more securely, SWETT provided his buckle with inclined lips *b b* adjacent to the two slots, and nearly covering their lower openings, and thus also he secured increased friction or bight upon the band from the direct pressure of the expanding cotton.

Among the chief advantages of this tie are its great ease and rapidity of manipulation, as also its perfect adjustability, the construction being such that a tie of given length can be readily adjusted so as closely to embrace bales of different sizes, or the same bale under different degrees of compression. Neither is the strength of the band weakened by cuts or perforations for the reception of fastening-pins or of rivets.

The buckle or fastening-piece shown in the drawings is specially designed for use with a thin flat metallic band. If it be proposed to use round wire, the shape of the holes in the buckle should be correspondingly changed.

What is claimed as new is—

1. The improved fastening for uniting the ends of metallic bands, consisting of a block or plate of metal provided with two parallel slots or openings, one of which is adapted to receive the free end of the band, and by the turning of the plate to cause the band to bend so as to take a bearing upon the adjacent bar of the plate when subjected to the strain of the expanding bale.

2. The combination, to form a bale-tie, of a flat metallic band and a fastening block or plate of metal provided with two parallel slots or openings, one of which is adapted to receive the free end of the band, and by the turning of the plate to bring such end to a bearing upon the adjacent bar, substantially as and for the purpose described.

3. The process of securing metallic bands around compressed bales of cotton and other elastic substances, which consists in inserting one end of the band into one slot of the fastening block or plate, and then passing the other end while straight through a second slot, and by the partial rotation of the plate bending such end until it takes a firm bearing when tightened by the expansion of the bale upon the adjacent cross-bar of such fastening-piece, substantially as described.

AMERICAN COTTON TIE SUPPLY CO.,
By J. J. McCOMB, *Manager*.

Witnesses:
FREDERIC COOK,
W. A. EWEN.